United States Patent Office 2,918,380
Patented Dec. 22, 1959

2,918,380

TREATMENT OF MILK

William Gardiner Wearmouth, Reading, England, assignor to National Research Development Corporation, London, England, a corporation of Great Britain No Drawing. Application September 10, 1956
Serial No. 608,671

Claims priority, application Great Britain
September 19, 1955

8 Claims. (Cl. 99—192)

This invention relates to the treatment of milk, which term is to be taken herein as including, where the context so permits concentrated milk.

It has been proposed to fill small containers with milk and freeze the milk so that it can be maintained frozen for a considerable period during storage or transport and eventually thawed for use. It has been found, however, that there is a tendency for the fat in the milk to separate out when the milk is thawed. The fat separation is such that it cannot be conveniently mixed and the appearance of the thawed milk is not generally acceptable.

According to the present invention milk which is to be stored in the frozen condition is subjected to vibrations at ultrasonic frequency, preferably in the range 0.75 megacycle per second to 2.0 megacycles per second. The vibratory treatment may preferably commence before the freezing of the milk and may be terminated before such freezing, provided the latter takes place within a limited period after termination of the vibratory treatment, preferably not exceeding one hour. It is found that milk which has been subjected to such a vibratory treatment can be stored in the frozen condition for a relatively long period without separation of the fat on thawing.

Preferably the milk is first pasteurised then subjected to the vibratory treatment, then filled into packages which are sealed and immersed in a cold liquid to effect freezing. The vibrations may be produced for example by an ultrasonic vibrating crystal and transmitted to the milk by means of a probe inserted into a pool of the milk. The most advantageous frequencies are between four-fifths and one and a quarter megacycles per second, e.g. 1 megacycle. The duration of the treatment depends on the power of the vibrations, which may conveniently be between 100 and 250 watts of acoustical energy per gallon of milk. Thus, for example for a power of 200 watts a treatment lasting 2 minutes is effective, while at 150 watts 5 minutes are required.

The following is a description by way of example of a preferred method of carrying out the invention.

Natural full-cream milk may be first pasteurised by a bath process or by the known high-temperature short-time process. This may be immediately followed by treatment for a period of about 5 minutes with ultrasonic vibrations at 1–1.3 megacycles per second and a power of 150 watts per gallon of milk. The milk may then be packed in containers made of polythene or other suitable material which containers are heat sealed. The containers are then immersed in a bath of brine, alcohol or other suitable liquid at a temperature not above 5° F., e.g. between 4° and 5° F. The size of the containers, relative quantity of liquid and other conditions are preferably such that complete freezing is achieved within 40 minutes. Periods longer than 60 minutes may lead to some fat separation. The frozen milk is preferably stored at temperature from 5° F. to 10° F.

The combined sequence of pasteurisation, vibratory treatment and freezing all following each other without undue delay produces a particularly good result so that the thawed milk is indistinguishable from fresh milk even after some months of storage.

The storage life of the milk is not so good if pasteurisation is omitted, from which it appears that vibratory treatment at the frequency most desirable for preventing fat separation is not altogether effective as a sterilising process for the milk.

If desired the milk may be subjected to the vibratory treatment while it is already in a refrigerator or refrigerating bath, such treatment preferably being commenced before freezing has taken place.

I claim:

1. A method of treating milk which consists in pasteurising the milk, subjecting the milk to vibrations at ultrasonic frequency and then effecting freezing of the milk within a period of one hour after cessation of the vibrating treatment.

2. A method of treating milk which is to be stored in the frozen condition, wherein the milk is subjected to vibrations at ultrasonic frequency, and is then frozen, the vibratory treatment of the milk being terminated before the freezing of the milk, and the freezing of the milk being effected within a period of one hour of the completion of the vibratory treatment.

3. A method of treating milk as claimed in claim 2 wherein the frequency is from 0.75 megacycles per second to 2.0 megacycles per second.

4. A method as claimed in claim 3 wherein the vibrations have a frequency of between four-fifths and one and one quarter megacycles per second.

5. A method as claimed in claim 2 wherein the milk is pasteurised prior to said vibratory treatment.

6. A method as claimed in claim 2 wherein the milk, after the vibratory treatment is filled into packages which are sealed and immersed in a cold liquid to effect freezing.

7. A method as claimed in claim 2 wherein the conditions of freezing are selected to effect complete freezing within forty minutes.

8. A method as claimed in claim 8 wherein the power of the vibrations is from 100 to 250 watts of acoustical energy per gallon of milk.

References Cited in the file of this patent

UNITED STATES PATENTS

| 2,470,020 | Crowley | May 10, 1949 |
| 2,775,434 | Probst | Dec. 25, 1956 |

OTHER REFERENCES

Food Engineering, August 1953, p. 166.
Food Engineering, October 1953, p. 87.
J. Dairy Science 32 (9), pp. 812 to 816.